June 18, 1963  A. H. B. SWAN  3,094,232
TURNING ROLL APPARATUS
Filed Nov. 16, 1959  2 Sheets-Sheet 1
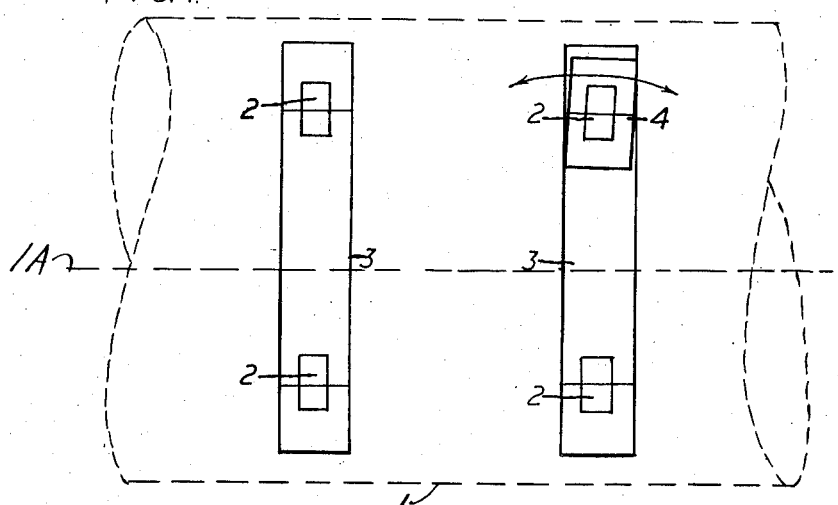
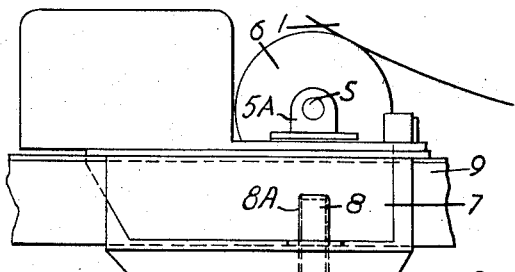
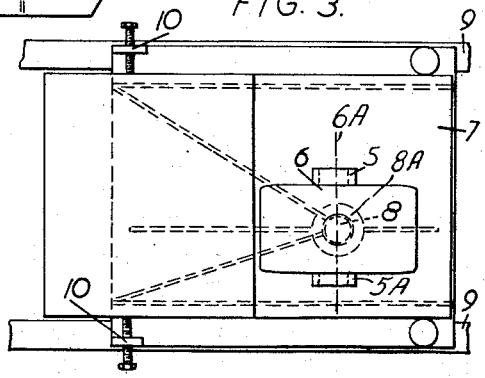
Inventor
ALLAN HENRY BARYE SWAN
By
Aaron R. Townshend  Attorney June 18, 1963 A. H. B. SWAN 3,094,232
TURNING ROLL APPARATUS
Filed Nov. 16, 1959 2 Sheets-Sheet 2
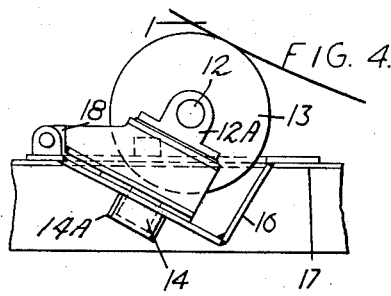
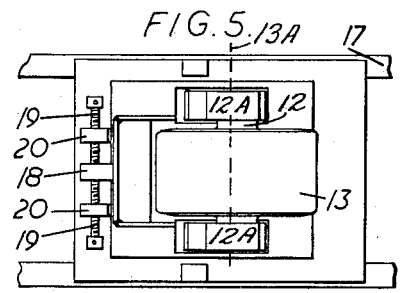
Inventor
ALLAN HENRY BARYE SWAN
By
Aaron R. Townshend, Attorney

United States Patent Office 3,094,232
Patented June 18, 1963

3,094,232
TURNING ROLL APPARATUS
Allan H. B. Swan, Newcastle-upon-Tyne, England, assignor to The British Oxygen Company Limited, a company of Great Britain
Filed Nov. 16, 1959, Ser. No. 853,242
Claims priority, application Great Britain Nov. 24, 1958
3 Claims. (Cl. 214—340)

This invention relates to turning roll apparatus for supporting circumferentially rotating bodies of cylindrical and similar form. Apparatus of this type includes at least four turning rolls or support rollers, rotatable about parallel axes and arranged to support a cylindrical body which rests on the rims of the turning rolls with its longitudinal axis disposed parallel to, between, and above the parallel axes.

Turning roll apparatus is used for example to support pipes, boiler shells, and other cylinders during the automatic arc welding of circumferential seams thereon. The cylinder being welded is supported on turning rolls which rotate it so that a circumferential seam is moved progressively past a stationary welding head.

One disadvantage which is sometimes experienced with this apparatus is that a relatively large diameter cylinder tends to screw itself along the turning rolls and undergoes an axial movement in addition to its rotary movement. This is clearly objectionable since the circumferential seam then moves out of alignment with the stationary welding head. It is difficult to ascertain the exact cause of this screwing effect but it may be due to inaccuracies in the cylinder or to slight misalignment in the turning roll or to some other cause. In some cases this disadvantage may be overcome by use of an end stop for the cylinder but it will be appreciated that a heavy cylinder may exert a very considerable force on an end stop due to the screwing effect. For this and other reasons the use of an end stop may not always be convenient.

It is an object of the present invention to provide improved turning roll apparatus which enables a cylinder to be rotated without axial movement occuring to an unacceptable degree.

According to the present invention, in turning roll apparatus in which there is a tendency for axial movement of a body of cylindrical or similar form to take place when the body is rotated on the turning rolls, means are provided for transmitting to the curved surface of the body a counter-screwing effect which prevents or at least limits to an acceptable degree said axial movement of the body.

In general the counter-screwing effect will be transmitted to the body through one or a pair of the turning rolls which bear on the outer surface of the body. It would be possible, however, for this effect to be transmitted to the inner or outer curved surface of the body by one or more auxiliary rolls.

The counter-screwing effect is obtained by inclining the axis of the turning roll or pair of turning rolls to the axis of the body. This inclination may be in the plane including the axes of all the turning rolls, or, alternatively, in the case of a single turning roll, may be in a plane parallel to the tangential plane to the body at the point of contact with this turning roll.

The turning roll or the pair of turning rolls may be mounted on a pivot pin.

The invention will now be described by way of example with reference to the accompanying drawings in which:

FIGURE 1 is a diagrammatic plan of a roller bed having four turning rolls, one of which may be inclined to transmit a counter-screwing effect to a body supported thereby;

FIGURES 2 and 3 respectively show a side elevation and plan of a single turning roll which is mounted so that its axis may be inclined in the plane containing the axes of all the turning rolls; and FIGURES 4 and 5 respectively show a side elevation and plan view of a single turning roll which is mounted so that its axis may be inclined in a plane which is substantially parallel to the tangential plane to the body at the point of contact with this turning roll.

Referring to FIGURE 1 of the drawings, a body 1 in the form of cylinder having a longitudinal axis 1A is arranged to be supported on and rotated by four rubber tired turning rolls 2 during a circumferential welding or other operation. The turning rolls are mounted in pairs on base frames 3 with the axes of the turning rolls extending parallel to one another and to the axis of the body 1.

One of the turning rolls is mounted on a sub-frame 4 so that its axis may be inclined to the axis of the other rolls if axial movement of the body 1 takes place, thereby transmitting to the body a counter-screwing effect. The inclination is chosen to prevent or limit to an acceptable degree any axial movement of the body on the roller bed. Means are provided for maintaining the turning roll, which may conveniently be called the compensating roll, in the inclined position.

Referring to FIGURES 2 and 3 of the drawings, according to one example of construction, this inclination may be obtained by mounting the axle 5 of the compensating roll 6 having an axis 6A in a support 5A mounted on an auxiliary frame 7 provided with a socket 8A to receive a pivot pin 8 fixed to the base frame 9. The auxiliary frame 7 is movable about the pivot pin 8 in a plane parallel to that including the axes of the rolls and is maintained in a desired position and possibly moved to this position by two screw adjusters 10 abutting against opposite edges of the auxiliary frame 7. The screw adjusters comprise bolts engaging in screw threaded bores in the base frame 9. An inclination of the order of 5° may be sufficient to transmit to a cylinder supported and rotated on the rolls a counter-screwing effect which prevents axial movement of the cylinder on the rolls. The exact angle will be chosen to produce a counter-screwing effect which exactly compensates for any axial movement of the cylinder or which limits this movement to an acceptable degree.

In another construction, shown in FIGURES 4 and 5, the axle 12 of the compensating roll 13 is received in a support 12A mounted on a pivot pin 14 which is received in a socket 14A in an auxiliary frame 16 rigidly secured to a base frame 17. This socket is inclined to the vertical so that the inclination of the axis 13A of the compensating roll 13 is adjustable in a plane which is substantially parallel to the tangential plane to the cylinder 1 at the point of contact with the compensating roll 13. Secured to the pivot pin 14 is a projection 18 which may be located in a suitable position of adjustment by screws 19 which engage in lugs 20 on the base frame 17.

I claim:
1. Turning roll apparatus for supporting a rotating cylindrical body during the welding of a circumferential seam on the body, comprising at least four turning rolls for the body, mountings on which all of the turning rolls can rotate about parallel axes, the turning rolls then being in the parallel axis position, the turning rolls being arranged in pairs which are spaced apart longitudinally of the parallel axes, and the two turning rolls in each pair being spaced apart transversely of the parallel axes so that the cylindrical body can be supported on the turning rolls with the longitudinal axis of the body parallel to and above the parallel axes, the mountings for at least two of the turning rolls being adapted to maintain the axes of said two turning rolls only in the parallel axis position during rotation of the body, and adjustment means for mounting one of the turning rolls adapted to incline the axis of rotation of said one turning roll in both senses away from the parallel axis position through a small angle of the order of 5° whereby any tendency of a body rotating on the turning rolls to move in either axial direction may be reduced by the counterscrewing effect produced on the body by said one turning roll.

2. Turning roll apparatus for supporting a rotating cylindrical body during the welding of a circumferential seam on the body comprising at least four turning rolls for the body, mountings on which all of the turning rolls can rotate about parallel axes, the turning rolls then being in parallel axis position, the turning rolls being arranged in pairs which are spaced apart longitudinally of the parallel axis and the two turning rolls in each pair being spaced apart transversely of the parallel axes so that the cylindrical body can be supported on the turning rolls with the longitudinal axis of the body parallel to and above the parallel axes, the mountings for at least two of the turning rolls being adapted to maintain the axes of said two turning rolls only in the parallel axis position during rotation of the body, and adjustment means for mounting of one of the turning rolls adapted to incline the axis of rotation of said one turning roll in both senses away from the parallel axis position through a small angle of the order of 5° in a plane substantially parallel to the tangential plane to the body at the point of contact with said one turning roll whereby any tendency of a body rotating on the turning rolls to move in either axial direction may be reduced by the counterscrewing effect produced on the body by said one turning roll.

3. Turning roll apparatus for supporting a rotating cylindrical body during the welding of a circumferential seam on the body, comprising at least four turning rolls for supporting the body, mountings on which each of the turning rolls can rotate about parallel axes, said axes being parallel to the longitudinal axis of the cylindrical body, the turning rolls then being in the parallel axis position, the turning rolls being arranged in first and second pairs, one of said pairs disposed in spaced apart relationship longitudinally of the parallel axes, relative to the other of said pairs, and each turning roll in each pair being spaced apart transversely of the parallel axes to receive and support the cylindrical body on the turning rolls, the mountings for one of said pairs of the turning rolls being adapted to maintain the axes of said pair of turning rolls fixed in the parallel axis position relative to said body during rotation of the body, and adjustment means for the mountings of one of the turning rolls of said other pair to incline the axis of rotation of said one turning roll in both senses away from the parallel axis position through an angle less than 45° in a plane substantially parallel to the tangential plane to the body at the point of contact with said adjustable roll whereby any tendency of a body rotating on the turning rolls to move in either axial direction may be reduced by the counterscrewing effect produced on the body by said one adjustable roll.

References Cited in the file of this patent

UNITED STATES PATENTS

| | | |
|---|---|---|
| 1,611,418 | Clipsham | Dec. 21, 1926 |
| 2,626,717 | Kraner | Jan. 27, 1953 |
| 2,781,930 | Menser | Feb. 19, 1957 |
| 2,795,320 | Dillingham | June 11, 1957 |
| 3,007,428 | Wuesthoff | Nov. 7, 1961 |
| 3,008,439 | Stanley | Nov. 14, 1961 |

FOREIGN PATENTS

| | | |
|---|---|---|
| 701,411 | Great Britain | Dec. 23, 1953 |